United States Patent
Skufca et al.

[11] Patent Number: 5,575,601
[45] Date of Patent: Nov. 19, 1996

[54] HELIX FASTENER ASSEMBLY

[75] Inventors: James Skufca, Lakewood; Matthew R. Skufca, Jr., Cleveland, both of Ohio

[73] Assignee: Heelix Fasteners, Inc., Cleveland, Ohio

[21] Appl. No.: 393,328

[22] Filed: Feb. 23, 1995

[51] Int. Cl.$^6$ .............................. F16B 21/00; F16B 15/08
[52] U.S. Cl. ...................... 411/339; 411/453; 411/908; 29/525.05
[58] Field of Search ...................... 411/338, 339, 411/394, 508–510, 453, 907, 908, 922, 454; 29/525, 525.05

[56] References Cited

U.S. PATENT DOCUMENTS

| | | |
|---|---|---|
| 2,217,661 | 10/1940 | Anderson . |
| 2,515,773 | 7/1950 | Johnson ................................ 411/453 |
| 3,515,419 | 6/1970 | Baugh ................................ 411/339 X |
| 3,702,087 | 11/1972 | Schmitt . |
| 3,856,050 | 12/1974 | Rooney ................................ 411/908 |
| 3,865,006 | 2/1975 | Massoney ............................ 411/394 |
| 4,003,107 | 1/1977 | Klein et al. . |
| 4,384,803 | 5/1983 | Cachia . |
| 4,384,804 | 5/1983 | Cachia et al. . |
| 4,693,861 | 9/1987 | Lapeyre . |
| 4,797,295 | 1/1989 | Franco et al. . |
| 4,846,611 | 7/1989 | Sadri et al. ...................... 411/339 X |
| 4,861,208 | 8/1989 | Boundy . |
| 4,925,353 | 5/1990 | Perugini .............................. 411/453 |
| 5,186,590 | 2/1993 | Oldendorf . |
| 5,190,424 | 3/1993 | Kazino et al. . |

FOREIGN PATENT DOCUMENTS 1483060  8/1977  United Kingdom .................. 411/338

*Primary Examiner*—Neill R. Wilson
*Attorney, Agent, or Firm*—Fay, Sharpe, Beall, Fagan, Minnich & McKee

[57] ABSTRACT

A fastener assembly formed of molded plastic components and comprising helically grooved studs interference fitted into smooth walled cylindrical bores.

10 Claims, 1 Drawing Sheet

HELIX FASTENER ASSEMBLY

BACKGROUND OF THE INVENTION

The subject invention is directed toward the fastener art and, more particularly, to a fastener assembly and method of using the same to provide a semi-permanent connection between molded plastic components.

A variety of different fastener assemblies are in use for permanently and semi-permanently joining molded plastic components. For example, conventional threaded fasteners such as screws and bolts have been used alone and in combination with molded bosses, interengaging studs, and "molded-in" thread inserts. In addition, certain molded plastic fasteners, including ratchet-type fasteners (e.g., fir tree fasteners), have been in use as a separate fastener element or as an integrally molded part of the joined components.

The prior fastener assemblies have been capable of adequately performing their intended function. They have, however, suffered from certain disadvantages. For example, conventional threaded fasteners are typically labor intensive with respect to assembly. Also, for example, the usual molded plastic fasteners sometimes exhibit reduced holding capabilities and usually require complex and expensive molds having multiple slides and other moving parts.

SUMMARY OF THE INVENTION

The subject invention provides a fastener assembly and method of using the same which overcomes the problems and deficiencies enumerated above with respect to the prior art fasteners.

In particular, and in accordance with a first aspect of the invention, there is provided a fastener assembly that is particularly suited for joining first and second molded plastic components. The fastener assembly generally comprises a plurality of cylindrical bores formed to extend inwardly from an outer surface of the first component. A plurality of stud members are molded integrally with and extend outwardly from an outer surface of the second component and each of the said stud members is engaged in a separate one of the cylindrical bores in the first component. At least one of the stud members has at least one rib extending outward of the stud member and interference fitted in the respective bore by being axially and non-rotatably driven therein. The said at least one rib extends helically about the stud at a helix angle in the range of from about 45° to 135°.

Preferably, and in accordance with a further aspect of the invention, the rib has a crest formed by a curved surface and a generally planar surface that intersect at substantially 90°.

In accordance with yet a further aspect of the invention, each of the stud members preferably have at least one of the ribs extending outwardly into interference fitted relationship with its respective bore. The ribs, as mentioned, extend in helix relationship about the stud and the relationship of the two studs is such as to prevent relative rotation between the studs and the bores so that an unthreading operation cannot take place.

In accordance with a still further aspect of the invention, the crest of the helically extending rib is arranged so that attempted withdrawal of the stud from the respective bore results in engagement with the interior of the bore by the crest and the planar surface of the rib.

In accordance with yet another aspect of the invention, there is provided a method of joining first and second molded plastic components which includes the steps of forming a first cylindrical bore to extend inwardly from an outer surface of the first component. A first plastic stud member is integrally molded on the second component to extend outwardly from a surface thereof. The stud is formed with at least one helical rib extending radially outward thereof to a first diameter which is greater than the internal diameter of the first bore formed in the first component. The first stud member and the first bore are positioned in axial alignment and non-rotatably driven toward each other to interference fit the first stud member and the first bore. Preferably, the method includes the step of providing interengaging surfaces on the first and second components to prevent relative rotary movement therebetween in directions about the axis of the first stud member. It is also contemplated that the interengaging surfaces can be provided by forming a second stud member on one of the first and second components, a second bore on the other of the first and second components, and driving the second bore and the second stud toward one another to inference fit them.

In accordance with a further aspect of the invention, the helical rib is provided with a helix angle in the range of 45° to 90°.

Both the stud and the bore can be formed integrally with the first and second components by being molded directly therewith. Additionally, the interengagement and frictional fitting of the stud in the associated bore can preferably take place while the components are at an elevated temperature resulting from the molding operation.

As can be seen from the foregoing, a primary object of the invention is the provision of a fastening system which allows molded plastic parts to be joined and semi-permanently connected by a simple axial driving step without the use of special tools or the like.

A further object of the invention is the provision of a simplified fastener assembly that can be directly incorporated into molded plastic components or incorporated into separate fastener elements applied to the components at the time of assembly.

A further object is the provision of an assembly method which allows molded plastic parts to be rapidly joined without the use of special tools or the like.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 4:
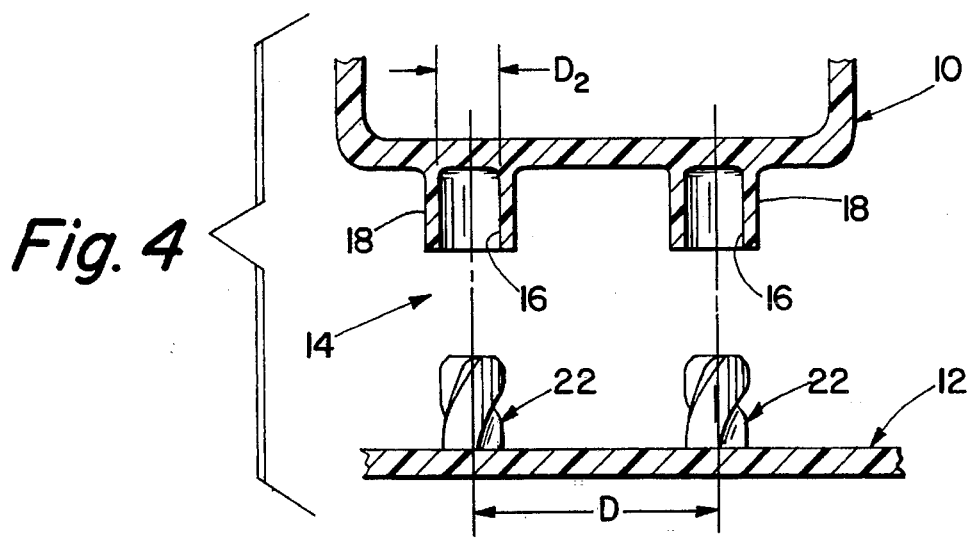
FIG. 4 is a cross-sectional view similar to FIG. 1 but showing the components in their assembled condition.

Referring now to the drawings wherein the showings are for the purposes of illustrating the preferred embodiment of the invention only and not for purposes of limiting same, FIGS. 1 through 4 best illustrate the invention and the various features thereof. In particular, referring to FIGS. 1 and 4, there is shown a first molded plastic component 10 which is joined to a second molded plastic component 12 by a preferred form of fastener assembly formed in accordance with the subject invention. The components 10 and 12 do not in and of themselves form any particular part of the invention and their configuration and design could be as required for any particular plastic molded assembly being constructed. The fastener assembly portion 14 is intended to semi-permanently join the components in a manner such that they cannot be readily disassembled short of destruction of the fastener assembly itself. In particular, the two components 10, 12 are of the type generally formed by known injection molding processes. The first component 10 is, as shown in FIG. 4, provided with a pair of cylindrical bores 16 that extend inwardly from the outer surface of the component. The bores 16 are smooth walled cylindrical bores and, in the subject embodiment, they are located centrally of cylindrical collar-like extensions 18 that extend outwardly from the main body of component 10. The bores 16 could, however, extend inwardly of the main body rather than being included as portions of the extensions.

Figures 2, 3:
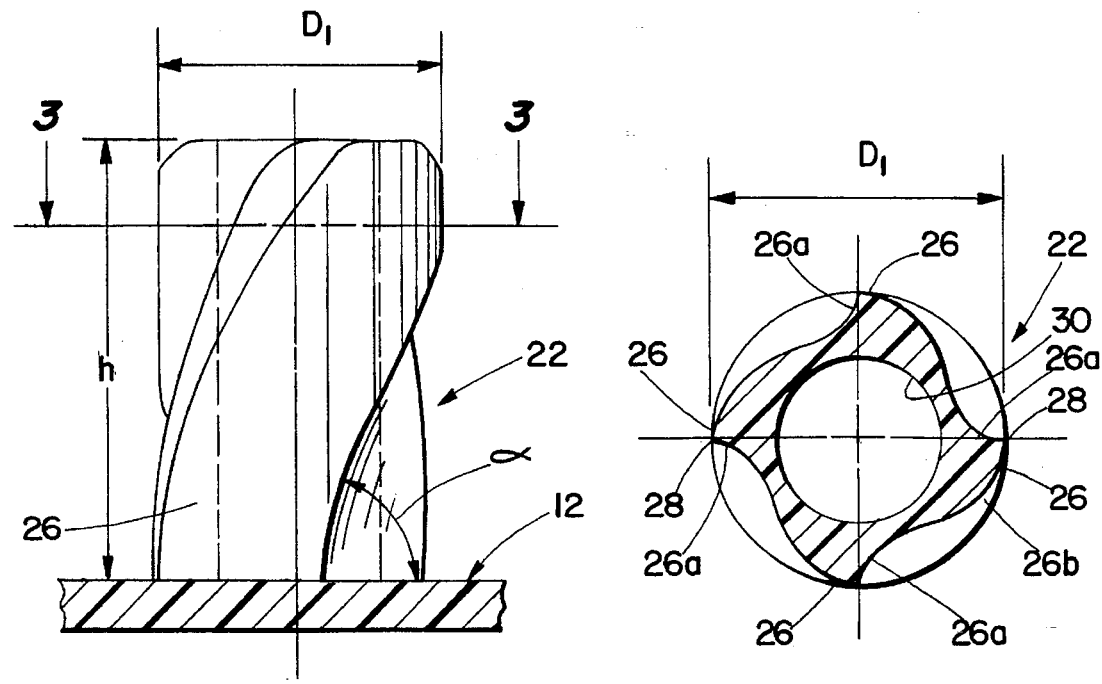
FIG. 2 is a greatly enlarged view of one of the stud members shown in FIG. 1.
FIG. 3 is a cross-sectional view taken on line 2—2 of FIG. 3.

Formed integrally on the second molded plastic component 12 are a pair of stud members 22 that extend in parallel and are spaced apart a distance D corresponding to the distance between the bores 16 in component The configuration and arrangement of the stud members 22 is best seen with reference to FIGS. 2 and 3. In particular, the stud members 22 have a generally cylindrical shape with a maximum outer diameter $D_1$ which is slightly greater than the inner diameter $D_2$ of the bores 16. The height of the studs 22 is not critical, but it is preferably generally equal to the depth of the bores 16. As will become apparent, however, the actual length and depth requirements for the studs and bores, respectfully, will vary and would be influenced by the type of fit required, the materials of construction and other structural considerations relative to the mating components 10 and 12. It is important, however, that the exterior surface of the studs be provided with at least one helical rib 26 configured generally as best seen in FIG. 3. Note that, in the preferred embodiment, there are four of the ribs 26 which extend upwardly about the outer surface of the studs 22. Each of the ribs 26 extends in a slow helical spiral about the respective stud at a helix angle in the range of from 45° to something less than 90°. The helix can be either left or right-hand subject to certain limitations as will subsequently be apparent.

The configuration of the ribs 26 can best be seen in FIG. 3. The leading face 26a of each rib 26 is preferably at a neutral or slightly positive rake and is formed by a generally planar face that lies in a radial plane of the stud 22. The crest 28 of each rib 26 is preferably a relatively sharp corner (a 90° corner in this embodiment) and is formed by the juncture of the face 26a and the smoothly curved face 26b that forms the back or rear side face of the rib As can be seen, each of the studs 22 is preferably hollow and has an inwardly extending central bore 30 that extends substantially the full length of the associated stud 22. The bore 30 reduces the amount of material in the studs and facilitates molding. Further, it tends to eliminate warping of the stud during the cooling of the plastic after the injection molding operation. In addition, the bore 30 provides some radial resilience to the stud and is believed to increase the holding power of the assembly.

Figure 1:
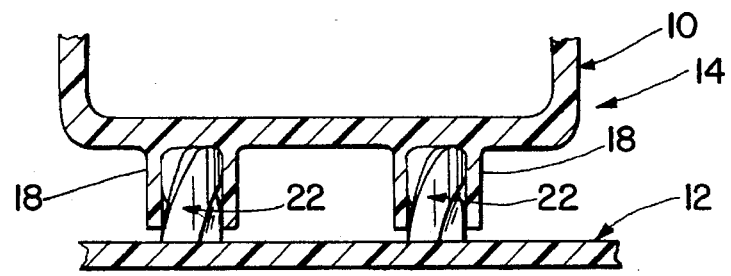
FIG. 1 is a partial cross-sectional view of molded plastic components provided with a fastener assembly formed in accordance with a preferred embodiment of the subject invention.

After the components have been molded with the shape and configuration shown, they are positioned in axial alignment as shown in FIG. 4 and driven together non-rotatably to the assembled position shown in FIG. 1. Because the diameter $D_1$ is a few thousandths of an inch greater than the diameter $D_2$, an interference fit results between the studs 22 and the associated bores 16. In addition, because of the relationship of the smooth contoured side of the ribs 26, entry of the stud into the bore is possible without requiring application of a significant driving force. However, if an attempt is made to withdraw the studs from the bore, the crest 28 and the associated planar face 26a engage into the wall of the bore and greatly resist extraction of the stud from within the bore. When there are two or more of the studs extending between the two components, relative rotation is not possible and extraction of the stud by a threading operation cannot take place. The same results can be achieved through the use of a single stud and some associated engagement surfaces between the components 10 and 12 that would prevent relative rotation.

Preferably, the components can be assembled while the plastic of the components is still warm from the molding operation. In such instances, the joining of the components is accomplished with a reduced force and a better engagement of the ribs with the interior of the bores is possible. Although the subject device shows the ribs as having a right-hand helix configuration, a left-hand helix could equally well be used provided that the location of the faces 26a and 26b are reversed from that shown in FIG. 3. That is, a left-hand configuration would require a mirror image situation with respect to FIG. 3.

Although many different mold constructions could be used for forming the helical studs, the preferred form is as shown and described in our copending U.S. application, Ser. No. 08/392,527, filed concurrently herewith and entitled "Mold Apparatus for Helical Articles".

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A fastener assembly particularly suited for joining first and second molded plastic components comprising:

a plurality of cylindrical bores formed to extend inwardly from an outer surface of the first component; and, a plurality of stud members molded integral with and extending outwardly from an outer surface of the second component and each said stud engaged in a separate one of the said cylindrical bores in the first component, at least one of the stud members having at least one rib extending outwardly of the stud member and interference fitted in the respective bore by being axially and non-rotatively driven thereinto, the said at least one rib extending helically about the stud at a helix angle in the range above 45° said at least one rib having a crest formed by a curved surface and a planar surface that intersect at substantially 90°.

2. The fastener assembly as defined in claim 1 wherein the said cylindrical bores have smooth walls.

3. The fastener assembly as defined in claim 2 wherein each of the stud members have at least one rib extending outwardly and is interference fitted in its respective bore by being axially and non-rotatively driven thereinto.

4. The fastener assembly as defined in claim 3 wherein the stud members are parallel to each other.

5. The fastener assembly as defined in claim 3 wherein the ribs on the stud members are of the same configuration on each stud member.

6. A method of joining first and second molded plastic components comprising the steps of:

a) forming a first cylindrical bore to extend inwardly from an outer surface of the first component;

b) integrally molding a first plastic stud member on the second component to extend outwardly from a surface thereof to a terminal stud end, the first stud being formed with a helical rib extending radially outwardly thereof to a diameter greater than the internal diameter of the said first bore formed in first component, the helical rib having a crest formed by a curved first surface on a first side of the rib and an intersecting generally planar second surface on a second side of the rib, said first and second surfaces intersecting at a sharp corner;

c) positioning the said first stud member and the said bore in axial alignment and non-rotatively driving the first and second components toward each other to interference fit the first stud member in the first bore; and, d) providing interengaging surfaces the first and second components to prevent relative rotary movement therebetween in directions about the axis of the first stud member.

7. The method as defined in claim 6 wherein the helical rib is provided with a helix angle in the range above 45°.

8. The method as defined in claim 6 wherein the interengaging surfaces are provided by forming a second stud member on one of the first and second components and a second bore on the other of the first and second components.

9. The method as defined in claim 8 wherein the second stud member is formed on the second component and extends parallel to the first stud member.

10. The method as defined in claim 9 wherein the second stud member is provided with a helical rib.

* * * * *